March 19, 1946.    S. E. HYBINETTE ET AL    2,396,658
PROCESS OF PRODUCING MAGNESIUM AND OTHER METALS
Filed Feb. 6, 1942
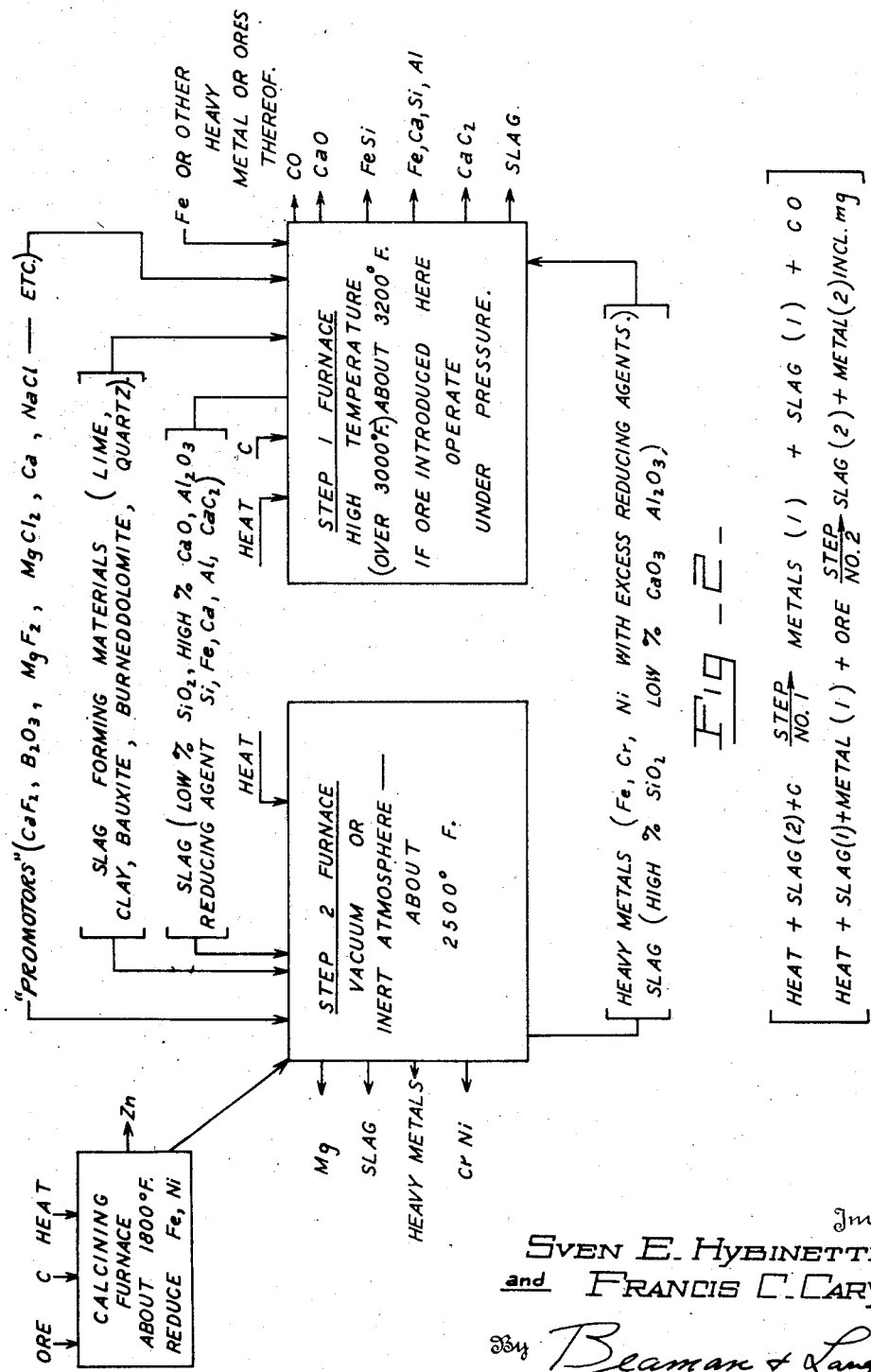
Inventors
SVEN E. HYBINETTE
and FRANCIS C. CARY
By Beaman & Langford
Attorneys Patented Mar. 19, 1946

2,396,658

UNITED STATES PATENT OFFICE 2,396,658

PROCESS OF PRODUCING MAGNESIUM AND OTHER METALS

Sven E. Hybinette and Francis C. Cary, Wilmington, Del.

Application February 6, 1942, Serial No. 429,830

7 Claims. (Cl. 75—67)

This invention relates to the thermal production of magnesium, ferrosilicon and other metals from magnesium silicate raw materials or from mixtures of magnesium oxide and silica. The invention also relates to the production of magnesium from other magnesium bearing materials.

Magnesium has been produced by the thermal reduction of the oxide obtained from the carbonates, magnesite, and dolomite, the latter containing varying amounts of lime. The oxide has also been obtained from brucite, the hydroxide. Reduction of the oxide with carbon requires temperatures around 2200° to 2300° C. which is more than 1000° C. above the boiling point of the metal. At these temperatures, impurities in both ore and carbon are also reduced and vaporized and contaminate the metal. Shock cooling of the mixture of carbon monoxide and metal vapors is practiced to prevent reversion of the above reaction. That process is attended with dangers, difficulties, reduced yield and forces the introduction of further operations to refine the metal as is known in the art.

The reduction of magnesium oxides has been done with aluminum, silicon and calcium or alloys or carbides thereof and is accomplished at lower temperatures than with carbon and without evolution of gas and dilution of the magnesium vapor formed, but the reactions are slow especially with silicon. Large volumes of slag are also produced both from materials and additions used and from unreacted materials, magnesium silicates and silicon suboxides formed, which are discarded. These losses add both to cost of materials and energy requirement.

Silicon and ferrosilicon have been produced by the thermal reduction with carbon, of the oxide, quartz, also a high refractory and requiring temperatures around 1600° C. Materials of high purity are used to obviate large quantities of slag and absorption by the metal of impurities and loss of metal produced, disbursed in the slag. As the silicon content of the alloy increases, the energy requirement is disproportionately higher due partly to silica blows, with large quantities of energy dissipated and yield reduced. Slags would mantle the blows, and increase yield, and reduce energy required, but heretofore have been avoided because producing such slags that would be discarded is not only considered the more costly, but makes the metal impure. Such impurities are the metals aluminum and calcium, which are advantageous to our process. Carbon monoxide is evolved and has not heretofore been utilized in production of magnesium with the ferrosilicon produced.

We have found that magnesium silicates may be used to great advantage to produce both magnesium and silicon by combining separate processes of making magnesium and of making silicon. Furthermore, many of the disadvantages of each process, i. e., material loss due to slags, loss of yield due to lack of slags, impurities absorbed into the silicon, excessive energy imput in each process and loss of gas produced and other disadvantages herein mentioned are made advantageous to the combined process. In addition, we have found that the same process may be employed to obtain magnesium from raw materials which do not contain silicon.

An object of this invention is the production of both magnesium and silicon metal or ferrosilicon from natural or other magnesium silicate materials.

Another object of the invention is to reduce an ore or equivalent raw material with a reducing agent to produce a metal, which reduction will not produce a gas and to reduce the residue to produce the first named reducing agent.

Another object of the invention is to produce magnesium and other metals by reducing magnesium silicate materials having other metals in combination, with a reducing agent which will not produce a gas, and reducing the residue to provide the first named reducing agent, metal being withdrawn from the process following each reduction.

Another object of the invention is to produce magnesium by a reduction of magnesium silicate materials.

Another object of the invention is to reduce a magnesium silicate in two steps, reducing the magnesia in one step and the silica in another step.

Another object of the invention is to reduce magnesium silicate materials in two steps, reducing the magnesia in one step and the silica in another step, and to employ in the magnesium reducing step an eutectic slag.

Another object of the invention is to reduce magnesium silicate materials in two steps, reducing the magnesia in one step and the silica in another step, and to employ in the magnesium reducing step a highly liquid slag.

Another object of the invention is to reduce magnesium silicate materials in two steps, reducing the magnesia in one step and the silica in another step, and to employ in the magnesium reducing step a solid residue.

Another object of the invention is to produce magnesium by reducing magnesium silicate materials in a process in which the metals present in the slag or residue are recovered.

Another object is to provide magnesium by a cyclic reduction process wherein magnesium is produced as the product of a reduction in one step and the oxidized reducing agent is reduced in another step.

A further object of the invention is to reduce magnesium silicate raw materials in two steps, reducing the magnesia in one step and the silica in another step, and employing in the magnesium reducing step a highly liquid slag of sufficient liquidity to serve as a wetting agent to aid the contact between the magnesia and the reducing agent.

These and other objects will be apparent from the following specification when taken with the accompanying charts in which:

Fig. 1 illustrates the broad principles of one form of the invention, and

Fig. 2 illustrates the specific principles of one form of the invention.

Among natural minerals are talc, serpentine, the magnesium bearing micas, the amphiboles, the pyroxenes, chondrodite, olivine and other magnesium silicates, none of which have heretofore been utilized for the production of either or both magnesium and silicon metals, and from each of which it would be uneconomical to produce either metal alone according to the prior art. In one embodiment of the invention the above and other magnesium silicates are employed according to the present invention to provide not only magnesium and silicon, but also other metals that may be present in the raw material.

While the reduction of MgO has been done with silicon with some measure of success, as before stated, it has been found difficult to get complete reduction. The formation of stable magnesium silicates has interfered. It has been thought that when the raw material already contained such compounds, the reaction would be impossible to carry out. This is true if the conventional conditions used in the production of magnesium from MgO or burned dolomite are imposed. The same difficulty is met with when a similar reduction of a magnesium silicate is done with calcium, calcium carbide or aluminum. The residue still contains a considerable amount of MgO as a silicate.

Likewise if magnesium silicate were used in place of silica with carbon in the conventional practice to make ferrosilicon it would likewise be uneconomical because most of the magnesia would be reduced and vaporized which would about double the cost of producing ferrosilicon alone. If it was attempted to recover the magnesium vapors the difficulties with CO dilutions mentioned above would be encountered. The simultaneous reduction of both magnesia and silica with carbon would produce about twice the volume of CO gas to dilute the magnesium vapors and react therewith and little magnesium would be recovered.

For these and other reasons as will appear herein, magnesium silicate has never been used for the production of either magnesium or silicon.

For the purpose of this invention, the metals present in the aforementioned ores or other raw materials that may be used may be divided into three groups. The first group includes iron, chromium, nickel and silicon, the oxides of which are easily reduced by carbon at temperatures well below their boiling point. The second group includes aluminum and calcium, the oxides of which are easily reduced by carbon at temperatures below their boiling points only in the presence of other metals which act as collecting (absorbing) agents. The third group includes magnesium, zinc, and cadmium, the oxides of which can be reduced by carbon only at temperatures above the boiling point of the metals and produce metal vapors commingled with CO gas with the attending difficulties above mentioned, except that zinc, and cadmium do not react with the CO gas. It is to be understood that all of the metals of the above groups do not exist in each ore or raw materials used in the present invention, but when they do occur they may be grouped as indicated. Furthermore, it is contemplated that within the broad scope of the invention, other recoverable metals may fall within the indicated groups should they occur in the raw materials or slagging materials which may be used. Above and hereinafter reference to oxides contemplate also silicates which may be present and which may be considered substantially as oxides as far as the chemical reactions occurring are concerned. For instance, $MgSiO_3$ may be considered as MgO plus $SiO_2$.

It will be noted that the oxides of the metals of the third group may be reduced by metals of the first and second groups without the evolution of a gas. For example, 2MgO plus Si equals 2Mg plus $SiO_2$, no gases being evolved to dilute or react with the magnesium vapor. Alloys or carbides of the metals of the first and second groups may be substituted for such metals and will reduce the oxides of the third group in the same way. Carbides of the metals act substantially as a mixture of the metal and carbon.

According to the present invention, magnesium silicate raw materials are rendered in two steps. Generally considered, in step I, designated such for description, but not necessarily for the first operation, oxides of the metals of the first and second groups, which constitute the slag of step 2, are reduced in a furnace with carbon to produce metals, possibly, as hereinafter explained, carbides, a slag, and carbon monoxide, and in step 2 the oxides of the metals of the third group, which are provided by the ore, are reduced in a furnace by the metals, and carbides if any, produced in step I. The residue oxides in step 2 should provide a slag which is highly liquid or solid so as to permit the ready escape of vapors.

The process according to the present invention is shown in its basic and simplified form in the chart of Fig. 1. Referring to the chart, step I shows that heat, plus slag from step 2 (including silicon and other metal oxides), plus carbon as a reducing agent give: step I metal (including silicon), plus step I slag, plus carbon monoxide, a gas which passes off and is usable as an energy source. Step 2 shows that heat, plus step I slag, plus step I metal as a reducing agent, plus ore (including magnesium and other oxides), give: step 2 slag, plus step 2 metal, including magnesium. It will be understood that steps I and 2 follow one another in succession. When $SiO_2$ is reduced in step I, it is a part of the residue of magnesium silicate raw material, or slag forming material as hereinafter explained, produced in step 2 and may appear as an artificial silicate. The MgO reduced in step 2 is present in step 2 as a part of the magnesium bearing raw material. Thus, as these oxides are reduced in separate steps they may be reduced in separate furnaces.

In general, certain of the metals are taken from the process at each step as a marketable product, and after such withdrawal the residue from each step is added to the charge of the next step. Thus, only metals are withdrawn from the operation as will hereinafter more fully appear and the oxides not completely reduced in a step are returned to succeeding steps to be again acted upon. Consequently all of the metal compounds are used and the metals recovered, thus avoiding the waste in slag of prior art processes, and effecting great economy. While Fig. 1 shows that the ore is introduced into the cycle in step 2, under certain conditions it can be introduced in either step as will hereinafter more fully appear. The reducing agent in step 2 can be used in excess, which with some ores is an advantage, but adds no cost to expense of the operation. The process may be operated to produce metals of high purity and which require no further refining.

In the actual carrying out of the invention, certain refinements and conditions of operation not apparent from Fig. 1 and not described in the general explanation of the invention above are brought into practice. These refinements and conditions will more fully appear together with the description of our process as applied to the reduction of olivine. It is to be understood that the following description applied to olivine relates equally well to other magnesium silicate materials, either those specifically mentioned hereinabove or to other materials that may be used.

Olivine is a high temperature refractory and limited quantities have been used for roofs of open hearth furnaces and similar service. There are extensive domestic deposits of olivine. It has a very high magnesium content and is a good potential source of magnesium metal. The composition varies but a typical analysis is as follows: $MgO$ 51, $SiO_2$ 35.5, $FeO$ 7.7, $Al_2O_3$ 4, $Cr_2O_3$ .5, $NiO$ .5, other .8.

Olivine is also a potential source of approximately 75% ferrosilicon. The reduction of this silicate has not heretofore been accomplished to make either magnesium or ferrosilicon. One reason in addition to those mentioned above, is because of the strong bond between the magnesia and the silica which locks the two materials securely, which lock must be broken in order to produce either magnesium or ferrosilicon from this ore. It is to be understood that a like bond may exist between the magnesia and silica of other magnesium silicates as well.

The reduction of olivine is carried out as follows: The olivine is crushed or ground and may then be calcined by heating it to about 1800 or 1900 degrees F. to drive off any water. Since olivine contains iron oxide and nickel oxide, both reducible at the calcining temperature, enough coke may be added, if desired, to reduce the iron oxide to provide iron and the nickel oxide to provide nickel in the calcining step. Should any other easily reducible metals be in the raw material they also may be reduced in the calcining step. In the example described, the nickel and iron will stay in the charge since their boiling points are above the calcining temperature. However, should easily reducible metals such as zinc and cadmium, for instance, be in the raw material, zinc and cadmium having boiling points lower than the temperature of the calcining step, they would be vaporized and if in sufficient quantity to warrant collecting, would have to be condensed.

The calcined olivine is used in step 2 described hereinabove. For step 2 there is added to the calcined olivine sufficient calcium, silicon and aluminum or the alloys or carbides thereof, and lime, silica and alumina, most of which substances are taken from an earlier carried out step 1 reduction as will be hereinafter described, to effect reduction by the metals added, with the application of sufficient heat, of all of the metals of group three. The quantities of such additions should be calculated against the ore analysis to produce all of said metals in the ore, and a slag containing 62% $SiO_2$, 23.3% $CAO$, 14.7% $Al_2O_3$ which is a low melting point eutectic and has a melting point of 2138 degrees F. If iron and nickel have been produced in the calcining step they should be considered in calculating the proportions of the step 2 charge. Otherwise, their oxides should be considered as requiring reduction. However, as will hereinafter be made clear, when a raw material having portions easily reducible by carbon is used, these portions should be reduced in the calcining step to avoid evolution of CO in step 2, should any carbide or excess reducing carbon be carried into step 2 from step 1. The lime, silica and alumina are all or in part the slag from step 1 and may in part be added as slagging materials from another source. The calcium, silicon and aluminum are provided by the step 1 reduction well mixed with the step 1 slag. While as a general rule in practice these metals come from step 1, any part of them may be provided from another source. However, it is one of the advantages of the invention that the reducing metals are provided in step 1. All substances entering step 2 either are first crushed to about 60 mesh and then compressed into pellets or briquettes or preferably the ore is crushed to 2" mesh and smaller and added to the liquid reducing agent and slag.

The temperature for the step 2 reduction should be about 2500 or 2800 degrees F. which is several hundred degrees above the melting point of the slag. In determining the temperature of step 2 consideration should be given to having a high enough temperature to reduce the group three metals and to melt the metals and their alloys involved, and low enough so that any carbon present will not effect a reduction and evolve an objectionable amount of CO. For the purpose of economy and high production the highest temperature usable and not detrimental to the furnace lining should be used. The lowest temperature to effect the desired reduction will always be low enough to avoid the evolution of CO when the eutectic slag is employed. Upon melting, the eutectic slag becomes very liquid due to its low melting point with respect to the temperature of the reaction. We believe that the liquid slag and the solid magnesium silicate are mutually dissolved in each other and that the strength of the bond is thereby reduced to such an extent as to permit the reduction of the magnesia. We also believe that the vapor pressure of MgO is favorably increased by this action. This slag also serves as a wetting agent aiding the contact between the oxides of the third group that may be present in the reaction and the metals of the first and second group that may be present in the reaction, and accelerating the reaction between the metals and oxides. The high liquidity of the slag also permits the vapors of the metals of the third group to rise freely and rapidly. The vapors of the metals of the third group liberated in the step 2 are condensed in a manner well known to those skilled in the art and are withdrawn for market and the heat of condensation may be utilized as in a second effects evaporator for reduction of magnesium oxide as in the former art. In the step 2 reduction, the first and third group metal oxides which are reducible at the temperature employed and by other metal present, are reduced. For olivine the first group would be chromium, iron and nickel. If desired, these may be withdrawn as a ferrochrome nickel alloy or may be carried with the step 2 slag to the step 1 reduction where they will settle out and may be drawn off with the product of that reduction. Any metals from step 1 carried into step 2 as excess reducing agents will settle out in step 2.

We have found that different slags may be employed so long as they have a low melting point and become highly liquid at the temperature of the reduction. Should the ore or other raw material employed have a composition which would render difficult the utilization of step 2 slag having the composition specified above, then the slag should have a composition which calculated against the analysis of the ore or other raw material being reduced, that will have a low melting point compared to the temperature of the reduction.

In the step 2 reduction of olivine described, since olivine contains only magnesium of the metals in the third group, only magnesium will be condensed out of the second step in the reduction of olivine. However, should an ore, containing any other of the group three metals, have been used, these metals should preferably be vaporized in the calcining step. The use of liquid slag, results in economy and permits rapid production on a large scale. Step 2 reduction should be carried out in a vacuum or in an atmosphere inert to magnesium, as hydrogen, or with an atmosphere of magnesium vapor. As hereinbefore generally stated there is no significant evolution of CO in step 2 to oxidize the liberated magnesium to reverse the reaction.

The slag from step 2 is reduced in step 1 with coke at a temperature of over 3000 degrees F. In determining the temperature of step 1, consideration should be given to having the temperature high enough for the carbon to rapidly reduce the oxides as $SiO_2$, $Al_2O_3$ and CaO to the extent desired. The step 2 slag may be introduced into step 1 in a liquid form which saves energy and speeds the reaction. The reduction is controlled so that the carbon reduces a part of the oxides in the slag, providing carbon monoxide, free metals of the first and second groups and unreduced oxides. The unreduced oxides are returned with a portion of the free metals to step 2, the free metals acting as reducing agents for reducing metals of the third group in step 2. Step 1 may be carried out at atmospheric pressures and the carbon monoxide evolved may be utilized to produce the energy required for step 2, for the calcining step or may be otherwise utilized as desired. The step 1 and 2 metals produced from olivine as the raw material are silicon, iron, aluminum, chromium and nickel. However, there will also be calcium which is produced from the reduction of the lime added to the process as slagging agent and to become a part of the slag hereinabove described. The lime may be added as burned dolomite. Part of the aluminum, magnesium and silicon produced may be produced from bauxite, burned dolomite and quartz respectively, when they are introduced as slagging agents. However, it will be understood that any slag which is not reduced, is used in the process and will continue in the process and need not be replenished.

The slag resulting from the reduction of step 2 is highly desirable in step 1, since it serves as a mantle to prevent losses from silica blows and apparently collects and holds the metal vapors which usually are lost, and increases yield, aids the reactions, and saves energy required for the production of the metals of groups 1 and 2. In fact, the saving in energy in the step 1 in producing the metals of the first and second groups as compared with the conventional method of producing ferrosilicon is about equivalent to the energy required for reducing the metals in the second step so that the combination of the two processes is highly economical and produces an integrated plant. The relatively low melting point slag resulting from the reduction of step 2, which is the eutectic described, is important because of its ability to unlock the bond between the silica and the magnesia. Accordingly, in order to be assured of a sufficient slag for mantling slag of step 1, slag forming materials may be added to either of the reduction steps or the calcining step or to each of them. For this purpose, we use lime, clay, bauxite, burned dolomite and quartz. Any slagging material added to either of steps 1 or 2, may be calcined to drive off moisture and $CO_2$.

The complex reducing agents produced in step 1 and used in step 2 are new products not on the market and are superior to any commercial products heretofore available for the reduction of metals of group three, because these reducing agents have higher energy content and are easily made to such composition as is best suited to and utilize the oxides of the particular ore being treated. In this way the additions are small and the production is increased per unit of material charged and the excess of all metals in the ore are reduced and recovered. By reducing agents of higher energy content we mean reducing agents which liberate a greater amount of energy upon being oxidized than heretofore known reducing agents. Much of the reducing agent is dispersed in the slag and would be lost were the slag discarded. Utilization of the slag with the reducing metals dispersed in it is obviously of great advantage in obtaining contact with the oxides of the metals in step 2 and facilitates efficient utilization thereof, rapid reaction and large scale production and good economy.

In the general description of the invention, we stated that all oxides not completely reduced in a step were returned to the process in the next step thus avoiding waste. It should here be mentioned, however, that sometimes, it may be convenient to discard a part of the slag in either step. The percentage discarded in any case is very small so that waste is negligible as compared to prior art process where all slag was discarded.

We have found that there may be added to either of the reduction steps, or to the calcining step, or to each of them, certain substances which will increase the liquidity and effectiveness of the slags to aid the reduction as hereinbefore stated. We have found, for example, that certain fluorides and chlorides may be employed, but chlorides generally cannot be used for magnesium metals because of added corrosive properties to the metals. There are certain limited uses where they might not be objectionable. We have also found that boron or its compounds can be used without detrimental effect on the metal, but with marked effect upon the reaction. Specific examples of such substances which we term promotors are $CaF_2$, $B_2O_3$, $MgF_2$, $MgCl_2$, $Na_2O$ and NaCl. It is sometimes desirable to use one or more of these promotors with certain ores to reduce the amounts of other additions to get the effectiveness of the slag described and in small quantities, not exceeding 10% of the weight of the charge, may be added to the slag described with beneficial effect.

While it appears to us that the wetting action of the very liquid slag, together with the freeing of the metallic vapors to permit them to rise freely and rapidly, whether the very liquid slag is provided by a eutectic or by the use of the addition materials herein specified, is responsible for the breaking of the bond between the magnesia and the silica, it is believed that the whole mechanism of the reaction is very complex. The action of the slag is not only a wetting but also a dissolving action. The ore is partially dissolved bringing MgO into the slag and the products of the reaction except magnesium vapor are soluble in the slag. Likewise the products of the reaction between solid ore and reducing agent are soluble in the slag. The heavy metals and their oxides present have an additional beneficial effect.

In furtherance of our investigation on breaking the bond between the magnesia and silica, we found that the liquidity of the slag was most important, whether obtained by the eutectic compositions described, by addition of promotors or catalysers, or by excessive temperatures with slags of other compositions. However, by providing a highly liquid slag, while at the same time maintaining a low reduction temperature, great economies may be effected and furnace, refractory and insulation difficulties may be avoided.

If sufficient iron is not available in the raw materials employed, there may be added to the charge for the step I reduction iron or iron ore to provide iron to serve as a collecting agent for silicon, aluminum, and calcium, although at the same time the iron will alloy with all of the metals provided by the reduction of step I. The amount of iron provided by the addition of iron or iron ore to the step I reduction may be calculated to produce an alloy containing as much iron as silicon. Such alloy will be liquid, at about 2250 degrees F. Since this melting point is well below the step 2 reduction furnace temperature, the ferrosilicon alloy is very liquid thereby aiding in the reduction of the magnesia. Instead of, or with iron or iron ore, other heavy metals or heavy metal ores may be added to provide a collecting agent.

The step I reduction is carried on as a continuous process, the raw materials being added to the furnace, the metals and slag being withdrawn from the furnace. Preferably step 2 reduction is carried on as a continuous operation, but available equipment may make it convenient to carry it on as a series of separate operations.

It is not an inflexible rule that the raw materials be added to the step 2 reduction. Thus they may be added to the step I reduction. However, in such case the reduction should be carried out under sufficient pressure to prevent the vaporization of the group three metals until the passing of the carbon monoxide. Following the passing of the carbon monoxide, the pressure may be released and the group three metals vaporized and condensed out.

For the purpose of indicating more clearly the controlling of the reaction of step I, the step may be considered as divided into two operations: (a) the production of metals of the first and second groups in sufficient quantities to equal the content of such metals in the ore charge of the previous step 2 and the removal of such metal from the furnace as a marketable product, and (b) the continuation of the reduction to produce metals or alloys or carbides thereof or mixtures thereof sufficient in quantity to reduce the group three metals in step 2, and a slag consisting of unreduced oxides, to be transferred with the reducing metals to step 2.

The quantity of coke used in step I reduction should be sufficient to provide carbon to reduce the oxides placed in the charge for step I reduction. For the case of olivine these consist principally of $SiO_2$, $Al_2O_3$ and CaO, the CaO entering the process as either a slagging agent or a promotor, as hereinbefore described. Greater energies are required to reduce the $Al_2O_3$ and the CaO than are required to reduce the $SiO_2$, hence a larger percentage of the $Al_2O_3$ and the CaO will remain as slag going back to the step 2 reduction. However, a partial reduction at least of the $Al_2O_3$ and the CaO is desirable as the aluminum and calcium are more effective reducing agents with the ferrosilicon in the step 2 reduction and unless reduced and utilized the $Al_2O_3$ would continue to pile up in the process. Thus while there will be less CaO and $Al_2O_3$ in the slag from step I than in the slag from step 2, the percentage of these oxides will be higher in the slag from step I due to the large percent of SiO reduced in step I. It will be seen that considerable control may be exercised over the reduction by controlling the energy input thereof. Excess carbon, if any, may form carbides with the metal, but as explained above may not be objectionable since when they are carried over to the step 2 reduction, the carbides act mainly as metal and carbon, thereby taking part in the reduction.

It should here be noted that the calcining and preliminary reducing step may be carried on at temperatures higher than those indicated if such higher temperatures as required to reduce with carbon any substances in the raw materials which otherwise would be reduced with carbon in the number 2 step. It might conceivably be necessary to carry on the calcining and preliminary reduction step at temperatures ranging up to just below the temperature at which carbon would reduce the oxides reduced in step I in order to prevent the evolution of carbon monoxide in step 2. However, we have found that for substances in the raw materials which we prefer to use and which are mentioned herein, have as easily reducible substances, only those which may be reduced by the carbon at the calcining temperatures specified. The remaining substances in the raw materials which we prefer to use have been found to not be reducible by carbon within the range of temperatures usable for the number 2 step. Likewise in certain cases much lower temperature may be used in calcining or the calcining omitted for economy.

It has hereinbefore been mentioned that silicates in the reductions of the present invention act as oxides. While the silicates from the raw materials are present in step 2 reduction, it is believed undoubtedly true that there are artificial silicates in step 1 reduction. For instance, it is believed that, when calcium is employed as a reducing agent, the $MgSiO_3$ may be changed to $CaSiO_3$. The $CaSiO_3$ is a part of the step 2 slag and when it is reduced in the step 1 reduction, it acts in the same manner as CaO plus $SiO_2$.

The hereinabove described form of the invention is summarized in the chart of Fig. 2. The chart is not intended to illustrate all variations of the invention or all substances going into and leaving the steps of the process. The lines with the arrows indicate substances entering or leaving the steps, according to the directions of the arrowheads. It is to be understood, however, that the additions and subtractions indicated by the lines are not all essential nor need all substances shown take part in a process according to our invention.

While the invention hereinbefore described relates to the production of magnesium from magnesium silicates, it is also contemplated that the invention may be employed to obtain magnesium from other raw materials such, for instance, as dolomite. In such case, the dolomite is calcined to drive off moisture and $CO_2$ leaving MgO and CaO and other oxides. The calcined dolomite is then reduced in the same manner as the olivine and other magnesium silicates as disclosed herein employing the two-step process for recovering the metals including magnesium which may be combined with the natural dolomite and metals introduced as reducing agents.

Another variation of the invention is to remove the $SiO_2$ from magnesium silicate by reacting the same with hydrofluoric acid which is recirculated and reducing the remainder in the two-step process as described.

We have found that the temperature and therefore the speed of condensation has marked effect on the purity and cleanliness of the metal. We have found that the magnesium raw material can be made more active by fusion with the slag and promotors so that the magnesia can be reduced at lower temperatures. Also, we have found some magnesium oxides that naturally can be reduced at lower temperatures. The lower the temperature at which reduction takes place, the purer is the magnesium. If the magnesium is produced at such a high temperature that it can be condensed into a liquid on a surface kept at most at 2010° F. when the pressure is one atmosphere or at most at 2238° F. when the pressure is two and a half atmospheres, then the heat absorbed from the condensing gas on one side of the condensing surface can be transferred to another charge on the other side of the surface to reduce same and produce more magnesium. Although the condensing surface for the small temperature difference desirable for this condensing operation must necessarily be large but is easily compensated for by the increased production which adds about 25% to the magnesium production of step 2 without expenditure of additional energy. It is in fact a two effect vacuum evaporator condenser. Condensation of magnesium oxide vapor in the second effect is at lower temperature and at low vacuum.

Likewise the CO gas from step 1 may be employed to reduce similar charges in pots or retorts with increased economy.

It will be apparent from the foregoing specification that the process according to the present invention can be carried out in many different ways. It is, therefore, not intended that the specific disclosures in the specification be considered as limitations of the broad scope of the invention. The process utilizes new raw materials to produce essential metals for war and peace in an integrated plant and being self-sufficient is no burden on any other industry to produce these essential metals. The slag formed, from what normally would be termed impurities in the raw material, in the process is used not only for utilitarian purposes, but also as a source of metals. Other advantages appear. In the formation of the slags there is a portion of the metal produced by the reduction mixed with the slag. In this process this is an advantage for while a part of the produced metal may be drawn off for marketing, or for use in further reductions as above stated, and a part of the produced metal is required for service as a reducing agent in step 2, the metal mixed with the slag is better suited for reducing when in such mixture.

It is intended that in the claims as in the foregoing specification, when the context permits, the terms "oxides" and "oxide materials" include substances simple and complex which react in the same manner as oxides in the reactions involved. Examples are silicates and burned dolomite. "Ore" as used in the claims is intended to include as well as natural minerals, suitable artificial sources of the metals being recovered. While the claims refer to raw materials, ores and equivalent substances, it is to be understood that such raw materials, ores and substances in the usual sense may have been subjected to preliminary treatment such as calcining or preliminary reduction, such as at calcining temperatures with carbon to reduce portions thereof, without losing their broad classification for the purposes of the processes claimed. For instance, an ore which has been calcined and reduced with carbon at calcining temperatures is considered still to be an ore. Because of the complexity of materials used a true eutectic slag mixture may never be met with in the process. By the term "eutectic" we mean, any slag which contains a substantial portion of an eutectic.

Having thus described my invention, what I desire to secure by Letters Patent and claim is:

1. The production of metals by the thermal reduction of magnesium silicate ores containing oxides of a plurality of the metals of the group consisting of iron, chromium, nickel, silicon, aluminum, calcium, magnesium, zinc, and cadmium by reducing the oxides of the iron, chromium, nickel, silicon, aluminum or calcium present in one step and reducing the oxides of magnesium, zinc, and cadmium in another step by silicon, aluminum and calcium contained in the metals produced by the first named reduction, the second reduction being carried out so that sufficient alumina and lime will be present to combine with the free and combined silica, at least part of said alumina and lime be derived from the metal produced from the first step.

2. The process of producing metals by the thermal reduction of magnesium silicate and added slag material comprising the reduction of ore and slag materials having oxides of iron, silicon, aluminum and calcium and other metals, with carbon, to produce, one, ferrosilicon and other metals, two, a high silicon alloy with aluminum and calcium, and a slag with metals dispersed therein, said alloy and slag being sufficient to reduce the oxides of magnesium, zinc, and cadmium in the ore, removing a part of the ferrosilicon and metals from the process, using the residue to produce magnesium, zinc, and cadmium in a second reduction, removing from the process magnesium, zinc, and cadmium produced, and returning the residue from the second reduction to the first named reduction.

3. The production of metals by the thermal reduction of magnesium silicate ore in two steps, in separate furnaces, comprising in the first step reducing with carbon oxides of iron, chromium, nickel, silicon, aluminum and calcium present in the ore, reducing in the second step oxides of magnesium, zinc, and cadmium present in the ore with the aluminum and calcium contained in the metals produced in the first reduction, returning unreacted materials in each step to the other step, and withdrawing metals from each step substantially in the amounts contained in the ore added to the step, said reduction being controlled to maintain a slag in which a material part of the metals produced by the first step are dispersed through the slag produced therein, whereby when said slag is introduced into the second step, the metals dispersed therein are carried by the slag into intimate contact with the ore to be reduced.

4. The invention as defined in claim 3 wherein slagging materials are added to at least one of the steps and are at least in part reduced to provide additional reducing agents.

5. The invention as defined in claim 3 wherein the ore is calcined previously to the reducing steps, the calcining being in the presence of carbon to volatilize any zinc, or cadmium present.

6. As a method, the two-stage production of ferrosilicon and magesium from magnesium ferrosilicate and carbon by thermal reduction, comprising as the first stage the reaction of a slag and ferrosilicon which are products of the second stage of the method to produce magnesium, ferrosilicon of a lower silicon content than that produced in the second stage, and a liquid slag, and as the second stage of the method, the reaction of magnesium ferrosilicate, carbon, and the slag of the first stage of the method to produce the slag and ferrosilicon to be reacted in the first stage.

7. As a method, the two-stage production of magnesium and alloys from magnesium silicate containing materials and carbon by thermal reduction, the magnesium silicate containing materials including percentages of alumina comprising as the first stage the reaction of a slag and an alloy, both products of the second stage of the method to produce magnesium, a second alloy, and a second slag, said second alloy having a lower percentage of aluminum and silicon than the first alloy produced in the second stage, and as the second stage of the method, the reaction of magnesium containing materials, carbon, said second alloy and said second slag to produce said first alloy and said first slag.

SVEN E. HYBINETTE.
FRANCIS C. CARY.